(12) United States Patent
Heuer et al.

(10) Patent No.: US 9,751,635 B2
(45) Date of Patent: Sep. 5, 2017

(54) INDICATING DEVICE FOR INDICATING AN ACTIVATION STATUS OF AN ESCAPE SLIDE IN AN AIRCRAFT

(71) Applicant: Airbus Operations GmbH, Hamburg (DE)

(72) Inventors: Carsten Heuer, Hamburg (DE); Ilja Waigl, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/332,050

(22) Filed: Oct. 24, 2016

(65) Prior Publication Data

US 2017/0113813 A1    Apr. 27, 2017

(30) Foreign Application Priority Data

Oct. 23, 2015   (EP) .................................... 15191318

(51) Int. Cl.
   *G08B 21/00*   (2006.01)
   *B64D 45/00*   (2006.01)
   *B64D 25/14*   (2006.01)

(52) U.S. Cl.
   CPC ............. *B64D 45/00* (2013.01); *B64D 25/14* (2013.01)

(58) Field of Classification Search
   CPC combination set(s) only.
   See application file for complete search history.

(56) References Cited

U.S. PATENT DOCUMENTS

| 3,463,287 A * | 8/1969 | Smith | A62B 1/20 |
| | | | 182/48 |
| 6,676,082 B2 * | 1/2004 | Alberts | B64D 25/14 |
| | | | 244/137.2 |
| 2003/0080254 A1 * | 5/2003 | Alberts | B64D 25/14 |
| | | | 244/137.2 |

(Continued)

FOREIGN PATENT DOCUMENTS

| DE | 102004048217 | 4/2006 |
| EP | 1306304 | 5/2003 |

(Continued)

OTHER PUBLICATIONS

European Search Report, Apr. 25, 2016, priority document.

*Primary Examiner* — Travis Hunnings
(74) *Attorney, Agent, or Firm* — Greer, Burns & Crain ltd.

(57) ABSTRACT

A device for indicating an activation status of an aircraft emergency slide. The indicating device comprises an optical and/or acoustic signal emitting device, a status signal input, with a first input signal for an emergency slide activated state, and a second signal for a deactivated state, and a control, connected to the signal device, and to the status signal input, and configured to operate the signal device as a function of the status signal received, to indicate the status signal state. The indicating device comprises an inclination angle measurement device connected to the control for determining the inclination angle about a predetermined axis and provide an inclination angle signal output. The control determines, based on the determined inclination angle, whether a predetermined inclination angle has been exceeded for a predetermined time period and outputs, via the inclination angle signal output, a predetermined output signal only when this has occurred.

16 Claims, 6 Drawing Sheets

(56) References Cited

U.S. PATENT DOCUMENTS

| | | |
|---|---|---|
| 2004/0074696 A1 | 4/2004 | Horvath et al. |
| 2007/0176793 A1 | 8/2007 | Bruch |
| 2008/0048889 A1 | 2/2008 | Naegler et al. |
| 2011/0139934 A1 | 6/2011 | Giesa et al. |
| 2015/0145702 A1 | 5/2015 | Waigl |

FOREIGN PATENT DOCUMENTS

| | | |
|---|---|---|
| EP | 1410987 | 12/2006 |
| EP | 1877309 | 1/2008 |
| EP | 2108585 | 10/2009 |
| EP | 2878530 | 6/2015 |

\* cited by examiner

INDICATING DEVICE FOR INDICATING AN ACTIVATION STATUS OF AN ESCAPE SLIDE IN AN AIRCRAFT

CROSS-REFERENCES TO RELATED APPLICATIONS

This application claims the benefit of the European patent application No. 15191318.3 filed on Oct. 23, 2015, the entire disclosures of which are incorporated herein by way of reference.

BACKGROUND OF THE INVENTION

The present invention relates to an indicating device for indicating an activation status of an emergency slide in an aircraft, as well as to a door arrangement and an aircraft comprising such an indicating device.

In larger passenger aircraft, aircraft doors can be coupled or are connectable to an emergency slide trigger or actuation device so that, when the aircraft door concerned is opened, an emergency slide arranged thereon is triggered or actuated or deployed. For this purpose, an emergency slide safety release lever is moved before take-off and with the doors closed to an "armed" mode, in which the emergency slide is in an activated state in which the opening of the aircraft door triggers or actuates the emergency slide. After normal landing, the emergency slide safety release lever is moved to a "disarmed" mode so that a coupling with or connection to the emergency slide actuation device is disabled and the aircraft doors can be opened normally without actuating the emergency slide.

Such an emergency slide is normally in a retracted state in which the emergency slide is integrated into the aircraft door. When the emergency slide is actuated, it is extended to an extended state in which it projects outwards from the aircraft door and extends at an angle between the door opening and the ground to allow passengers to reach the ground safely.

Because emergency slides are employed in emergency situations, such as in particular after landings in which the aircraft can be damaged, it is necessary to take into account the fact that, at the time of using the emergency slide, the aircraft is not in its normal horizontal position, but is instead for example in a position in which the longitudinal axis of the aircraft is inclined or extending obliquely relative to the ground. For example, the nose of the aircraft may extend obliquely upwards. In such cases, the distance from an aircraft door to the ground can be greater than in the case of the normal horizontal position, so that an emergency slide which is designed for the normal horizontal position either does not reach the ground at all or lies at too steep an angle to allow it to be safely used.

For this reason, it is known that emergency slides—for example in the form of an optionally additionally extendable lengthening or extension portion—can be extended to two different lengths, a normal length corresponding to a horizontal position of the aircraft, and an extended length corresponding to an aircraft position in which the pitch angle exceeds a certain limit value relative to the horizontal. This in particular covers so-called "nose-up" situations, in which the nose of the aircraft points obliquely upwards. In order to realize the determination of the pitch angle required in these situations, the aircraft has several pitch angle sensors, which are installed at a central location in the aircraft and connected via cable connections to the door control devices or emergency slide actuation devices of individual doors. The door control devices or emergency slide actuation devices connected to the pitch angle sensors can thus take into account the current pitch angle during actuation or triggering of the emergency slide and control the extension length of the emergency slide accordingly. Alternatively or additionally, a warning that the emergency slide is not usable can be issued.

This arrangement is not very flexible and is associated with relatively high costs with respect to both installation and maintenance.

SUMMARY OF THE INVENTION

It is an object of the invention to provide a simple and flexibly applicable solution, which can allow reliable control of the extension length of an emergency slide by means of an aircraft's emergency slide actuation device, and to provide a door arrangement and an aircraft which implement this solution.

In order to able to indicate the activation status of an emergency slide or escape slide in an aircraft, appropriate indicating devices are typically installed in or on the corresponding aircraft doors, which indicating devices optically and/or acoustically signal or indicate at least the activated state of the emergency slide either continuously or when there is a risk that a door may open.

According to the present invention, an indicating device for indicating an activation status of an emergency slide in an aircraft is provided, which indicating device has an optical signal device for emitting an optical signal and/or an acoustic signal device for emitting an acoustic signal. To generate the optical signal, the optical signal device can use any kind of indicating device, which, in particular, selectively generates a light signal, for example by means of a lighting device, on the basis of an incandescent lamp, an LED or a plurality thereof. The lighting device can be configured to emit a continuous light or a flashing light, where the optical perceptibility of a flashing light may be greater than that of a continuous light. The acoustic signaling device can similarly have a sound generation unit, by means of which an acoustically perceivable signal can be generated. The sound generation device can for this purpose have an electromagnetically or piezoelectrically operable loudspeaker or buzzer and, if necessary or if desired, a device for the selective emission of a signal sequence for reproducing a recorded or synthetic sound.

In addition, the indicating device has a status signal input for receiving a predetermined status signal which identifies the activation status of an emergency slide. The status signal input can, for example, have a terminal for connection with a cable, by means of which the status signal is delivered to the indicating device in a wired manner, or a reception device for wireless reception of the status signal. In any case, the status signal has a first signal status which is assigned to an activated status of the emergency slide, and a second signal status which is assigned to a deactivated status of the emergency slide. The status signal can be delivered during operation of the indicating device, for example by an emergency slide actuation device, a door control device or a separate detector, which detects, for example, the position of an emergency slide activation lever.

The indicating device additionally has a control device, which is connected to the optical signal device and the acoustic signal device, respectively, and to the status signal input and which is configured to operate the optical signal device and the acoustic signal device, respectively, as a function of the status signal received via the status signal input, in order to indicate the signal status of the status signal. Due to the assignment of the signal statuses of the status signal to the activation status of an emergency slide, it is thus possible to then indicate accordingly the activation status of the emergency slide associated with the device which delivers the status signal. In this regard, it is possible to continuously indicate both signal statuses, continuously indicate only the first signal status or to indicate the first signal status—and optionally the second signal status—only when additional conditions are satisfied, as is explained in detail below. The control device can, for example, be provided in the form of an electronics unit or as part of an electronics unit.

The indicating device is constructed or configured as coherent or continuous, and, in particular, as a coherent or continuous, compact unit or assembly, which can, in particular, be arranged or mounted on a door or a door panel or leaf of an aircraft door or which can, in particular, be integrated into a door trim or lining of an aircraft door. In other words, the optical signal device, the acoustic signal device, the status signal input and the control device—and the other components of the indicating device described below, as well as any other components—form such a coherent or continuous and, in particular, coherent or continuous, compact unit. Such an indicating device is particularly reliable and easily retrofittable, and no major modifications are required inside the aircraft concerned and, in particular, on a door. The continuous assembly can preferably have a housing with a fastening section and a visible side. The fastening section is adapted to enter into a mechanical connection with the door trim or lining or with a fastening means on the aircraft door. If the indicating device has an optical signal device, it is preferred that the housing is at least partially transparent in a section housing the optical signal device. The housing design must not therefore differ from that of a conventional warning light and the components integrated therein are largely protected from external influences, while the visibility of the optical signal device is retained. Completely independently of this, it is generally preferred that the continuous unit has a housing in which and/or on which all of its components are arranged.

The indicating device additionally has an inclination angle measurement device connected to the control device for determining the inclination angle of the indicating device about a predetermined axis and an inclination angle signal output. When the indicating device is appropriately installed in an aircraft in such a way that the predetermined axis lies along the pitch axis of the aircraft, the determined inclination angle corresponds to the pitch angle of the aircraft. As is explained below, the inclination angle measurement device can have, for the determination of the inclination angle about the predetermined axis, one or more inertial sensors for example, in particular, one or more acceleration sensors or a rotation rate sensor.

Further, the control device is adapted such that it determines during operation, on the basis of the inclination angle determined by the inclination angle measurement device, whether a predetermined inclination angle of, for example, 2°, preferably of 2.5° and more preferably of 3° or, for example, of −2°, preferably of −2.5° and more preferably of −3° about the predetermined axis, has been exceeded for a predetermined period of time, and only emits a predetermined output signal via the inclination angle signal output when the predetermined inclination angle has been exceeded for at least the predetermined time period. The predetermined output signal thus indicates the exceeding of the predetermined inclination angle for the predetermined time period. The predetermined time period can be selected such that measurement errors are avoided, in that temporary variations in the measurement value do not lead to the emission of the predetermined output signal. The control device can be configured such that, at times when the predetermined output signal is not emitted, i.e., the predetermined inclination angle was not exceeded at least for the predetermined time period, another output signal or no output signal at all is emitted via the inclination angle signal output. The predetermined output signal can be sent to an emergency slide control device or emergency slide trigger or actuation device and used by it to control the extension length of the emergency slide.

The inclination angle signal output can, for example, comprise an external terminal of the indicating device for connection with a cable, by means of which the predetermined output signal is delivered in a wired manner to an emergency slide control device or emergency slide actuation device, or to a transmitting device for wireless transmission of the predetermined output signal. The extension length of the emergency slide can then be controlled in the described manner. The inclination angle signal output can alternatively or additionally comprise an internal output inside the activation device, which is connected to the optical signal device and/or the acoustic signal device. The optical signal device and the acoustic signal device, respectively, is then adapted to emit a predetermined optical signal and a predetermined acoustic signal, respectively, when the predetermined output signal is received. This design allows an optical and/or acoustic warning to be provided if the position of the aircraft changes during an evacuation and the emergency slide can no longer be used as a result.

In the context of the present invention, it has been found that significant advantages can be obtained precisely from the integration of the inclination angle measurement and the evaluation of the inclination angle in an indicating device for indicating an activation status of an emergency slide. This solution thus involves very low installation costs because no central installation of pitch angle sensors is required and instead only the indicating device has to be installed individually and in a targeted manner on each door equipped with an emergency slide on which a control of the emergency slide's extension length on the basis of the pitch angle of the aircraft is desired and/or on which a warning that the emergency slide is not usable is desired. The corresponding doors can be delivered as finished components not requiring any additional installation expense during finishing In addition, a modular approach is provided which allows this function to be selectively provided in every door in a flexible and very simple manner A weight reduction can thus also be achieved because it is no longer necessary to prepare every door for activation on the basis of a pitch angle and for it to have, for example, an emergency power supply for this functionality.

By designing the indicating device as a compact unit or assembly, which can be integrated into a door trim or lining of the aircraft or can be arranged on or mounted to an aircraft door, it is advantageously possible to easily replace a conventional warning light signaling an emergency slide activation with the indicating device according to the invention. The indicating device is preferably designed such that it is designed like a conventional warning light, at least in an area or section required for the fastening, so that the door lining and a corresponding cutout or a fastening means arranged thereon need not be modified. The indicating device according to the invention thus has excellent potential for a retrofit solution because it is only necessary to replace a conventional warning light with the indicating device according to the invention.

In a preferred embodiment, the inclination angle measurement device is an inertial measurement unit with at least one inertial sensor, such as, for example, at least one gyro sensor or acceleration sensor, for the continuous or periodic capturing or detection of at least one directed or directional acceleration. It is possible that the inclination angle measurement device does not itself determine the inclination angle, but rather delivers a measurement signal on the basis of which the control device can determine the inclination angle. It is also possible that one of the at least one inertial sensors is adapted to detect the rotational acceleration about the predetermined axis, and/or that the at least one inertial sensor comprises three inertial sensors, each of which is adapted to detect the acceleration along another one of three different spatial directions. The inertial measurement unit can overall be an acceleration measurement unit with at least one G-sensor, i.e., an accelerometer or an acceleration sensor. A G-sensor can preferably measure the acceleration along three spatial axes and it is preferably based on MEMS technology. An inertial sensor could detect both an acceleration along one of three spatial axes and a rotational acceleration about one of three spatial axes. It is particularly useful if three- or six-axis sensors are used, which can detect both static positions and dynamic position changes and which are each realized for instance with a three-axis rotation rate sensor and a three-axis acceleration sensor on a chip. Such sensors or sensor arrangements are commercially available and preferably standardized.

In a preferred embodiment, the control device is configured such that the predetermined inclination angle and/or the predetermined time period are adjustable. This permits a simple and flexible adaptation to different doors and aircraft and to the location of the doors in the aircraft.

In a preferred embodiment, the indicating device additionally comprises a power supply terminal for connection with an external power supply, such as, in particular, an on-board power supply network of an aircraft, and a rechargeable energy storage means, which is arranged such that, during operation of the indicating device, during which the power supply terminal is connected to the external power supply, it is charged with power received via the power supply terminal and, in the event of failure of the external power supply, it operates at least the control device and the inclination angle measurement device. Even if it is alternatively possible that the indicating device has for its operation its own independent power supply, such as, in particular, a chargeable or non-chargeable battery, the design with a power supply terminal for connection to an external power supply and a rechargeable energy storage means, such as a rechargeable battery or a capacitor, for example, has the advantage that weight savings can be made. The integration of the rechargeable energy storage means into the indicating device means that the door control devices or the emergency slide actuation devices, which are equipped with their own rechargeable energy storage means for emergency operation, must no longer be designed such that they also have to provide power for the emergency operation of the functionality for controlling the extension length of the emergency slide. As a result, the rechargeable energy storage means, door control devices or emergency slide actuation devices can be selected in a smaller form and an indicating device according to the invention may be installed only on selected doors, so that an overall weight reduction is achieved.

In a preferred embodiment, the control device is additionally adapted to calibrate the inclination angle measurement device to an inclination angle about the predetermined axis of zero degrees upon each change of the status signal received at the status signal input from the second signal status to the first signal status and/or from the first signal status to the second signal status. Inclination angle measurement devices must be regularly calibrated due to an inherent drift of the sensors used, such as G-sensors for example. This is accomplished automatically in a particularly simple manner thanks to this embodiment. This calibration is based on the assumption that the aircraft is located on a horizontal surface before the take-off and after the landing and is therefore in its normal horizontal position. The change between the first and second signal status takes place each time the emergency slide is activated or deactivated, i.e., before each take-off and after each normal landing. In this embodiment, the indicating device thus has a self-calibrating function, which is regularly performed before each take-off and/or after each normal landing.

In a preferred embodiment, the indicating device is additionally adapted for indicating an unauthorized opening of a door of an aircraft parked on the ground. For safety reasons, all externally accessible doors of an aircraft parked on the ground are normally sealed with adhesive security seals, before the aircraft is left behind unattended. The security seals are designed such and are used such that the doors cannot be opened without destroying or at least irreversibly damaging the security seals, so that a missing or damaged security seal indicates that unauthorized access to the aircraft occurred or was attempted during the absence of authorized persons. In such a case, standard security measures require full examination of the aircraft, i.e., the entire aircraft must be checked over by security staff for possible intruders and hazardous items. Using the security seals involves considerable expense however, since they must be manually affixed, checked and removed without leaving any residue, by a person. Their use is additionally associated with false alarms because they are sensitive to moisture and dirt and can fall off and also because they can be damaged even without unauthorized opening of a door due to relative thermal expansion between the door and the aircraft fuselage. Security seals can also be forged or come into the possession of unauthorized persons, and new stock must continuously be purchased because they are intended for a single use only.

In this embodiment, in which the indicating device is also adapted for indicating an unauthorized opening of a door of a, particularly unattended, aircraft parked on the ground, the indicating device also has a sensor for capturing or detecting a distance between the sensor and an object located in a detection area or zone of, for example, two to five meters in front of the sensor. As is described in detail below, after arrangement of the sensor or of the entire indicating device on a door of an aircraft, such an object is, in particular, a fixed part or component of the aircraft, which has a static reference position relative to the sensor. As is also explained in detail below, other such objects can also, in particular, be persons who approach the door.

In addition, the indicating device in this embodiment comprises a signaling device, which has a first state and a second state, and a reset device coupled or connected to the signaling device, which reset device is adapted or configured to place or bring the signaling device into the first state when a user carries out a predetermined reset operation. The reset device may be part of the signaling device or it may be designed as a separate component. Moreover, the indicating device comprises an enabling device, which is adapted or configured to provide as an output signal, selectively, a predetermined disable signal and a predetermined first enable signal. The enabling device may, for example, be constructed such that the provision of the disable signal or the first enable signal, respectively, is triggered selectively by performing a predetermined disabling operation or a predetermined first enabling operation, respectively, at the enabling device or a separate component of the indicating device or a separate device by a user.

Lastly, in this embodiment the control device is connected to or coupled with the sensor, the signaling device and the enabling device. This makes it possible for the control device to receive signals from the sensor and the enabling device, and to transmit control signals to the signaling device. The control device is adapted or configured to change into a first operating mode when receiving the disable signal from the enabling device and to change into a second operating mode when receiving the first enable signal from the enabling device. The change into the first operating mode or into the second operating mode, respectively, may preferably be confirmed by an optical or acoustic signaling or signal, or through different optical or acoustic signaling or signals, by means of an optional suitable optical or acoustic signal device, which will be described in more detail later.

The control device is adapted or configured in such a manner that in the second operating mode, which, in contrast to the first operating mode in which the opening of a door is not monitored, is a monitoring mode in which the opening of a door is monitored in the manner described below, the control device detects, based on a sensor signal provided by the sensor and characteristic of the distance between the sensor and the or an object, respectively, a change or variation of the distance between the sensor and the object and upon detection of a change or variation of the distance sets or places the signaling device into the second state until the predetermined reset operation is carried out, in particular through generating a corresponding control signal that is transmitted to the signaling device and to which the signaling device reacts accordingly. Since the signaling device is set into the second state until the predetermined reset operation is carried out, the first state can no longer be obtained by establishing the original distance or a particular distance, such as, for example, through closing the door. In this context, provision may be made that the control device causes the setting into the second state upon detection of any variation or change. It is, however, preferred if the control device is adapted or configured so that it causes the setting into the second state only at a predetermined minimum variation or change, that is, upon a variation or change of distance that exceeds a predetermined value, and/or a variation or change of the distance over a predetermined minimum time span. By means of these measures the risk of false alarms can be further reduced since minor variations or changes in distance or brief interferences that are not caused by the opening of a door do not result in a change in state of the signaling device. Alternatively, or additionally, it may be advantageous if the control device is adapted and configured such that it only reacts to a variation or change that corresponds to an increase of the distance or a reduction of the distance.

The design according to this embodiment makes it possible to reliably and unambiguously determine whether a door of an aircraft was opened or whether some other unauthorized access to the aircraft has taken place. To achieve this, the indicating device with the sensor is arranged or mounted, respectively, on a door of the aircraft, which door is spaced inside the aircraft from a stationary component such as, for example, a section of the floor, a wall section, a portion of a galley or portion of a structure or monument, in such a manner that the stationary component is located inside the detection zone of the sensor, and that opening of the door causes a variation or change of the distance between the sensor and the stationary component. Subsequently, with the door closed, the first enable signal is provided by the enabling device to ensure that the signaling device is initially in the first state. Then, a change of the signaling device from the first state into the second state, which change can be determined at any time by inspecting the signaling device, indicates that the door has been opened. The indicating device may, for this purpose, comprise a display, on which it is displayed continuously, or upon user request, whether the signaling device is in its second state, or an optical indicator in form of an LED, for example. Note should be taken of the fact that, with the indication according to the invention, a situation can arise where a change of the signaling device from the first state into the second state takes place without the door having been opened, namely if a person inside the aircraft moves through the detection zone of the sensor, which therefore detects a variation or change of the distance to an object. However, since the signaling device is intended to monitor a parked aircraft where typically no person is on board, this is even helpful since it is also possible to detect events in which a person has gained access to the aircraft in a way other than through the monitored door.

In this embodiment the indicating device has the further advantage that it can be installed once in or on an aircraft for monitoring a door and can then be used again and again so that its application is very simple and cost-effective in the long term. Moreover, it is less sensitive to false alarms and manipulation than security seals are.

In this embodiment it is generally possible that the reset device and/or the enabling device are provided as part of the control device, i.e., are constituted by or implemented in the control device, or that the reset device and/or the enabling device are provided as separate components. It is also possible that one of the two devices is provided as part of the control device and the other one as a separate component. If the reset device or the enabling device is provided as a separate component, the respective device may preferably be part of the same electronics unit as the control unit, or it may also be provided on a separate electronics unit.

In this embodiment the signaling device may comprise a non-volatile electronic memory or storage device. Here the first state and the second state correspond to different predetermined values that are stored in a predetermined memory or storage area of the memory device. In other words, a predetermined memory area exists in which different values can be stored. If one or more first predetermined values are stored in the memory area, the signaling device is in its first state, and if one or more second predetermined values are stored in the memory area, the signaling device is in its second state. Such a design of the signaling device is particularly easy to implement and is particularly tamper-proof If such a non-volatile electronic storage device is provided, the signaling device may further comprise an optical signal device for emitting an optical signal and/or an acoustic signal device for emitting an acoustic signal, which may be constituted by the optical signal device or the acoustic signal device already described or by a separate optical signal device or acoustic signal device. The control device is then adapted or configured to operate the optical signal device and/or the acoustic signal device to emit the optical signal or the acoustic signal, respectively, upon or subsequent to setting the signaling device into the second state. In particular, the second state may comprise the emission of the optical signal and/or the acoustic signal. Since the memory state of the memory device cannot, or not easily, be recognized from the outside, the provision of an optical signal device and/or an acoustic signal device has the advantage that the opening of a door becomes immediately apparent. Should the optical signal device and/or the acoustic signal device fail, for example due to a depletion or interruption of a power supply or due to a damage of the optical signal device and/or the acoustic signal device, the second state can still be determined by inspecting or investigating the memory state of the memory device.

In the embodiment in which the indicating device is also adapted for indicating an unauthorized opening of a door of a, particularly unattended, aircraft parked on the ground, the enabling device may preferably comprise a receiver for receiving wireless signals and may be adapted or configured to provide the disable signal upon receiving a first predefined wireless signal and to provide the first enable signal upon receiving a second predefined wireless signal. These wireless signals may, for example, be emitted by a dedicated remote control unit without which an enabling and disabling is not possible. So as to make the monitoring or intercepting of the wireless signals more difficult, wireless signals of low range may be used, such as, for example, NFC signals.

In this regard, in a particularly preferred version or variant, the receiver may be an RFID receiver, and the first and second predefined wireless signals can then be generated by an RFID transmitter with predefined identifier, which is preferably part of a system that also comprises the indicating device. The RFID receiver and RFID transmitter may, in particular, be paired, so that the wireless signal received by the RFID receiver is examined for a predetermined identifier assigned to the RFID transmitter, and/or the RFID receiver expects that the wireless signal transmitted by the RFID transmitter is encrypted with a predetermined encryption assigned to the RFID transmitter so that the RFID receiver is able to verify the authenticity of the wireless signal or its origin from the RFID receiver. For example, an especially assigned key pair may be stored in the RFID receiver and in the RFID transmitter. Independently from that, the RFID receiver may be an RFID reading device, which provides power for the operation of the RFID transmitter by way of a transmitted interrogating signal, provided that the RFID transmitter is located within a predetermined distance from the RFID reading device and which may be an RFID tag. Advantageously it is then sufficient to place the RFID transmitter, which is preferably designed as a portable unit, temporarily or briefly in the vicinity of the indicating device in order to operate or actuate the enabling device, that is, the portable unit need only be brought close to the indicating device by authorized personnel for the purpose of enabling or disabling. To this end the RFID transmitter may comprise a switch to establish or determine whether the first or the second wireless signal is transmitted, or the first and the second wireless signal may be identical and the enabling device changes between providing the disable signal and the first enable signal every time this signal is received. Alternatively, it would also be possible for the RFID reading device to transmit information to the indicating device with its interrogating signal concerning the fact whether the control device is in the first operating mode or in the second operating mode, and that the RFID transmitter is adapted or configured to be able to determine the current operating mode from the interrogating signal and to transmit, depending on the detected operating mode, the first or the second wireless signal to the enabling device, so that a change in operating mode is taking place. The two latter options, which do not require a switch on the RFID transmitter, are particularly simple to use.

Alternatively, the enabling device may comprise a signal input for wirelessly or wiredly receiving external signals and is adapted or configured to provide as output signal the respective received external signal, or to provide as output signal the disable signal, if a first predetermined external signal is received, and the first enable signal, if a second predetermined external signal is received. In the former case, the disable signal or the first enable signal, respectively, is provided if it is received as external signal, that is, it is externally generated and simply passed on. In contrast, the latter case permits the connection to a central or associated separate control unit—for example via an AFDX network data line, a CAN network data line, or the like, or a different data line that is present in an aircraft door—and thus the possibility, where necessary, of simultaneously enabling or disabling, respectively, multiple indicating devices. The external signals may, for example, also be generated by a code input device, or the code input device may be part of the enabling device.

In the embodiment in which the indicating device is also adapted for indicating an unauthorized opening of a door of a, particularly unattended, aircraft parked on the ground, the predetermined reset operation may preferably be the receipt of a predefined wireless or wired reset signal by the indicating device. In this respect the exact same possibilities exist as they were described above for the enabling device, that is, the reset device may comprise a receiver for receiving wireless signals, and in particular an RFID receiver, wherein the receiver or RFID receiver, respectively, may be the same as the one described above for the enabling device, or a receiver with the same characteristics, or the reset device may comprise a signal input for the wireless or wired reception of external signals, for which the same applies as was described for the signal input of the enabling device.

In another preferred embodiment, which can be provided as an alternative to the embodiment in which the indicating device is also adapted for indicating an unauthorized opening of a door of an, in particular unattended, aircraft parked on the ground, or which can be provided in combination with this embodiment, the indicating device comprises both the optical signal device and the acoustic signal device. Just like in the embodiment in which the indicating device is also adapted for indicating an unauthorized opening of a door of an, in particular unattended, aircraft parked on the ground, the indicating device further comprises a sensor for detecting a distance between the sensor and an object located in a detection area or zone of, for example, two to five meters in front of the sensor. Exactly the same things apply to this sensor as what has been described in detail with regards to the embodiment in which the indicating device is also adapted for indicating an unauthorized opening of a door of an, in particular unattended, aircraft parked on the ground. If both embodiments are combined, one and the same sensor can be used. In any case, the control device is adapted or configured to operate at least one of the optical signal device and the acoustic signal device when a person approaches to within a distance that is less than a predetermined limit or limit distance. In this regard, the control device may preferably be adapted or configured to operate the optical signal device when a person approaches to within a distance that is less than a first predetermined limit, and to operate the acoustic signal device when a person approaches to within a distance that is less than a second predetermined limit, wherein the first limit is greater than the second limit When a person approaches the indicating device it may, for example, emit at first an optical signal so that the person is already informed about the approximation at a relatively large distance, that is, significantly more than an arm's length, preferably at most 1.1 m, for example, to warn that an emergency slide is active, as will be described in more detail below. When a person approaches closer than the second limit, which is, for example less than 1 or 1.5 arm's lengths, preferably at most 0.5 m, an additional acoustic signal may be emitted, which warns the person explicitly, for example, to the fact that the emergency slide will be deployed if a handle provided on the door is operated.

If the control device is adapted or configured to operate at least one of the optical signal device and the acoustic signal device when a person approaches to a distance of less than at least one predetermined limit, this possibility can be provided as a third operating mode, beside the first operating mode and the second operating mode. The two corresponding embodiments are then combined, and the first operating mode is, for example, an operating mode in which the indicating device as a whole is not active. Moreover, it may also be provided that the third operating mode may be selectively carried out simultaneously with the second operating mode, that is, that in a combined operating mode, the control device is adapted or configured both to set or bring the signaling device into the second state until the predetermined reset operation is carried out upon a variation or change of the distance between the sensor and an object, and to operate at least one of the optical signal device and the acoustic signal device when a person approaches to a distance of less than at least one predetermined limit The control device is then preferably further designed such that a change is possible between any of the available operating modes, that is, between the first, second and third operating modes and possibly the combined operating mode. The change can take place in the same manner as described above for the change between the first and the second operating mode. For example, further corresponding enable signals may be provided for, to which the control device reacts accordingly. Alternatively, it is also possible that the control device in the second operating mode is adapted or configured to operate at least one of the optical signal device and the acoustic signal device upon an approach of a person to within less than at least one predetermined limit In the embodiments, in which the control device is adapted or configured to operate at least one of the optical signal device and the acoustic signal device when a person approaches to a distance of less than at least one predetermined limit, the indicating device is advantageously, in particular, also adapted or configured to indicate the activation status of an emergency slide in an aircraft. It is true that the position of an emergency slide safety release lever or of a differently constructed actuation element is often visually clearly recognizable, and—as already explained—additional warning lights are typically installed in or on the aircraft door, which warning lights provide an optical indication of the state of the emergency slide activation. Nevertheless, due to time pressure and unpredictable situations on board the aircraft, it can happen occasionally that the emergency slide activation lever remains in the "aimed" state after landing, and when opening an aircraft door, an emergency slide is deployed accidentally. This causes damage near the aircraft and leads to high subsequent costs and uncertain down-times for the aircraft due to the required complex and time-consuming re-integration of the emergency slide. This is independent from the door design and from the aircraft manufacturer. There are solutions that prevent the accidental deployment of emergency slides, for example through facilities that detect the contacting of a component of an aircraft door by a person and which emit an optical and/or acoustic warning if a person approaches the door or touches the handle if the emergency slide actuation device is coupled with the aircraft door. However, a solution of this kind may require a modification of the aircraft door.

By means of the above embodiments, in which the control device is adapted to operate at least one of the optical signaling device and the acoustic signaling device on approach of a person below at least one predetermined limit distance, it is advantageously possible to provide an effective device for indicating an activation status of an emergency slide and for preventing an unintentional triggering or deployment thereof, which can be particularly reliably and easily retrofitted, and requires as few as possible major modifications inside the aircraft concerned and in particular on a door. The optical signal device and/or the acoustic signal device then serve to generate an optically perceivable signal and an acoustically perceivable signal, respectively, which indicates to a person that an emergency slide will be triggered or deployed upon opening of a door of the aircraft.

In the embodiments, in which the control device is adapted to operate at least one of the optical signaling device and the acoustic signaling device on approach of a person below at least one predetermined limit distance, the sensor is, in any case, able to detect an approach of a person towards the sensor and thus towards the indicating device that accommodates it, so that it is possible to determine whether and/or at what distance a person is in front of the sensor. Based upon information determined by the sensor, the control device connected thereto is able to selectively operate the optical signal device and the acoustic signal device. Specifically, this means that the control device is able to emit an optical and/or acoustic warning signal, based on the distance of a person from the sensor or the indicating device, respectively, through which optical and/or acoustic warning signal the person is made aware of the fact that if the door is opened one has to expect deployment of the emergency slide. Moreover, the indicating device is preferably configured and designed such that, as with commonly used warning lights, a continuous light is generated by the optical signal device and a continuous sound is generated by the acoustic signal device, respectively, as soon as the door opening lever is moved by a predetermined amount towards the door opening position when the emergency slide is armed. To this end, the control device is connected to an external sensor for detecting the position of the door opening lever.

In the case of the above embodiments, in which the control device is adapted or configured to operate at least one of the optical signal device and the acoustic signal device when a person approaches to a distance that is less than at least one predetermined limit, it is further preferred that the control device is provided with at least one enable signal input and is adapted or configured to activate or interrupt the operation of the optical signal device and the acoustic signal device based on a second enable signal that can be received via the enable signal input. In this manner the control device is able to make the operation of the optical signal device and the acoustic signal device dependent on the landing state of the aircraft and/or the position of an emergency slide activation lever located on the respective door. This has the advantage that a corresponding monitoring only takes place when the aircraft has landed and the emergency slide activation lever is in a certain position, where there is the danger that the door is opened without disabling the emergency slide activation lever. During regular flight operation, on the other hand, monitoring is not necessary because in that case there is no danger that a door is opened. A second enable signal, which depends on the landing state of the aircraft, may be generated by a separate device and transmitted to the enable signal input when the aircraft is on the ground. A further second enable signal, which depends on the position of the emergency slide activation lever, may be generated by a further sensor that is installed inside or on the emergency slide activation lever, monitors the position of the emergency slide activation lever and transmits a corresponding signal to the at least one enable signal input. In this regard, a sensor that already exists on the emergency slide activation lever, provided that its output signal is usable for the indicating device, or a separate, dedicated sensor, for example a retrofitted one, may be used. It is also possible to combine multiple different second enable signals, for example a second enable signal that is characteristic for the landing state and a second enable signal that is characteristic for the position of the emergency slide activation lever.

A second enable signal that depends on the landing state may be generated and transmitted by a central, already existing system of the aircraft. It is appropriate in these instances to connect the indicating device according to the invention via a corresponding bus or network with this central facility, for example via an AFDX network, CAN network, or the like. It is, however, also possible to connect the indicating device to a source for discrete or logic signals, respectively. The prerequisite for this is in all instances that a corresponding data cable or an individual line, respectively, is available in the door or is retrofitted to integrate it into the door. Nevertheless, it is also possible to use a wireless connecting device for this or a data transmission system that uses a power supply line that leads into the door.

It is preferred however that the inertial measurement unit is adapted for generating the second enable signal. The use of a G-sensor and/or at least one inertial sensor allows tracking of the movement of the aircraft in order to determine using this information whether the aircraft is on the ground or in flight. Various different methods can be employed for this purpose. For example, it is possible to capture a flight profile by continuously following or monitoring the movement of the aircraft, which flight profile comprises a climbing phase, a cruise flight with one or more cruising altitudes, a descending phase and a subsequent rolling or taxiing phase, in which the aircraft is strongly decelerated and an acceleration in the vertical direction is negligible. It would also be possible to just detect a characteristic landing shock that follows a descending phase, to detect a significant deceleration in longitudinal direction of the aircraft and/or to detect the obligatory turning process that takes place after every landing during the change from runway to taxiway. The different methods may require different arrangements with differently designed G-sensors or a different number of inertial sensors; when detecting a landing shock, it may be sufficient to use a single G-sensor or a single inertial sensor that detects the acceleration along the vertical axis of the aircraft. However, as already mentioned above in a different context, it is particularly appropriate to utilize commercially available and preferably standardized three-axes or six-axes sensors, which are able to detect not only static positions but also dynamic position changes and which are implemented, for example, each with a three-axes rotation rate sensor and a three-axes acceleration sensor on one chip. The determination whether or not the aircraft is on the ground is therefore made by the indicating device according to the invention itself. Thus, a connection to a bus or a network possibly not available in the door or the door trim or lining, respectively, does not need to be retrofitted so that the indicating device according to the invention is very flexible in its utilization for the most diverse aircraft types and aircraft doors. Furthermore, this design offers the great advantage that the already provided inertial measurement unit in cooperation with the control device provides various functionalities.

When the inertial measurement unit is adapted for generating the second enable signal, it is further advantageous, depending on which side of the fuselage the respective door is located, to provide the indicating device and/or the acceleration measuring unit and/or the inertial measuring unit with a device for defining a flight direction, that is, on the right or left side of the fuselage. It is appropriate to always construct the indicating device according to the invention as the same component or unit that can be integrated into many different aircraft doors. The acceleration measuring unit and/or the inertial measuring unit integrated into the indicating device can therefore be oriented in two different ways with respect to the flight direction. The installation side of the indicating device with respect to the flight direction must therefore be known in order to be able to reliably identify the landing state of the aircraft from the signals provided by the inertial measuring unit. Besides the setting "ex-factory" by means of respective firmware in the control device it may also be appropriate to provide a setting by way of jumpers on pins, that is, through pin programming, on the control device for setting during the installation of the indicating device.

Both in the embodiments in which the indicating device is adapted for indicating an unauthorized opening of a door of an aircraft parked on the ground, and in the embodiments in which the control device is adapted to operate at least one of the optical signaling device and the acoustic signaling device on approach of a person below at least one predetermined limit distance, the corresponding sensor for determining a distance is preferably adapted or configured to detect the distance on the basis of the travel time of a signal that is emitted by the sensor or by a separate signal emission device, is reflected by the object and is received by the sensor. For example, the sensor may, in particular, be an ultrasonic sensor. The latter may periodically emit an acoustic signal in the ultrasonic range, which is reflected by objects within the detection or monitoring zone, respectively, and reflected back to the sensor. The distance of the object from the sensor can be determined from the time difference between the emitted and the received signal. Sensors of this kind are sophisticated, readily available commercially and cost-effective. Moreover, ultrasonic sensors have a comparatively low weight and still permit a precise measurement and an adjustable sensor characteristic. Irrespective thereof, the sensor is preferably arranged in a region near the visible side to allow the uninterrupted monitoring of a detection or monitoring zone that is located in front of the indicating device and thus in front of the door or the door trim or lining, respectively, inside the aircraft. This detection zone is defined as a spatial section located in front of the aircraft door or as a surface area of a floor located in front of the door or the door trim or lining, respectively, by means of selecting and fine-adjusting the sensor and extends into the inside of the aircraft, that is, an area that faces away from the inside of the door or the door trim or lining, respectively. To permit an unimpeded perception of the optical signal of an optical signal device and an unimpeded or uninterrupted monitoring, the sensor and the respective optical signal device may be arranged side by side or one above the other on the visible side.

Moreover, according to the present invention, a door arrangement for an aircraft is provided, which door arrangement comprises a door panel or leaf with a first side and an opposite second side, which door panel or leaf is adapted or configured to be installed in an opening in a fuselage of an aircraft in such a manner that it is moveable between a closed position, in which it closes the opening and the first side faces an interior space of the aircraft and the second side faces outwards, and an opened position, in which the opening is accessible. The door leaf comprises a defined horizontal direction, i.e. a defined direction which, following installation in an aircraft, shall be oriented in such a manner that it extends parallel to a horizontal surface if the aircraft is placed on this surface. Moreover, the door arrangement comprises an indicating device according to one of the above described embodiments, which is disposed on the door panel or leaf, for example, in that it is mounted or integrated in or on a door trim or lining The door arrangement further comprises an emergency slide, which has a retracted state, from which it can be selectively extended to a first extended state with a first length and to a second extended state with a second length different to the first length. The emergency slide can be coupled to the door panel or leaf. It is however also possible for the emergency slide to be coupled to the aircraft fuselage, for example by mounting it in the aircraft fuselage below the respective door.

In addition, the door arrangement comprises an emergency slide actuation device, which can for example be part of a local door control device that controls various functions of the door, and which is adapted to trigger the extension when the door panel is moved from the closed position towards the opened position and the emergency slide is in the activated state. The emergency slide actuation device has an activation element, such as a lever for example, which can be moved to a first activation state, in which the emergency slide is in the activated state, and to a second activation state, in which the emergency slide is in the deactivated state. It also has a status signal output, at which the status signal is emitted and which is connected to the status signal input of the indicating device, and an inclination angle signal input, which is connected to the inclination angle signal output. The emergency slide actuation device is adapted such that, when triggering, it controls the extension of the emergency slide in such a way that the emergency slide is extended to the first extended state when the predetermined output signal is not received at the inclination angle signal input, and to the second extended state when the predetermined output signal is received at the inclination angle signal input.

In accordance with the present invention, an aircraft is also provided which has a fuselage, in which an opening is formed, and which has the door arrangement described above. The door panel is mounted in the opening in such a way that it can be moved between a closed position, in which it closes the opening, the first side faces an internal space of the aircraft, the second side faces outwards, and the horizontal direction runs parallel to a horizontal surface if the aircraft is located on the horizontal surface, and an opened position, in which the opening is accessible.

In embodiments of the indicating device in which it is also adapted for indicating an unauthorized opening of a door of an aircraft parked on the ground, the aircraft comprises a stationary component, such as a floor, a wall section, a section of a galley or a section of a monument, in the aircraft interior. The stationary component is at a distance from the door panel. The sensor is arranged on the door panel, as explained above with regards to the door arrangement, or on the stationary component in such a way that the stationary component and the door panel, respectively, is located in the detection zone of the sensor and an opening of the door panel effects a change in the distance of the sensor from the stationary component and the door panel, respectively.

BRIEF DESCRIPTION OF THE DRAWINGS

In the following an embodiment of the invention is described in more detail with reference to the attached drawings.

DETAILED DESCRIPTION OF THE PREFERRED EMBODIMENTS

Figure 1:
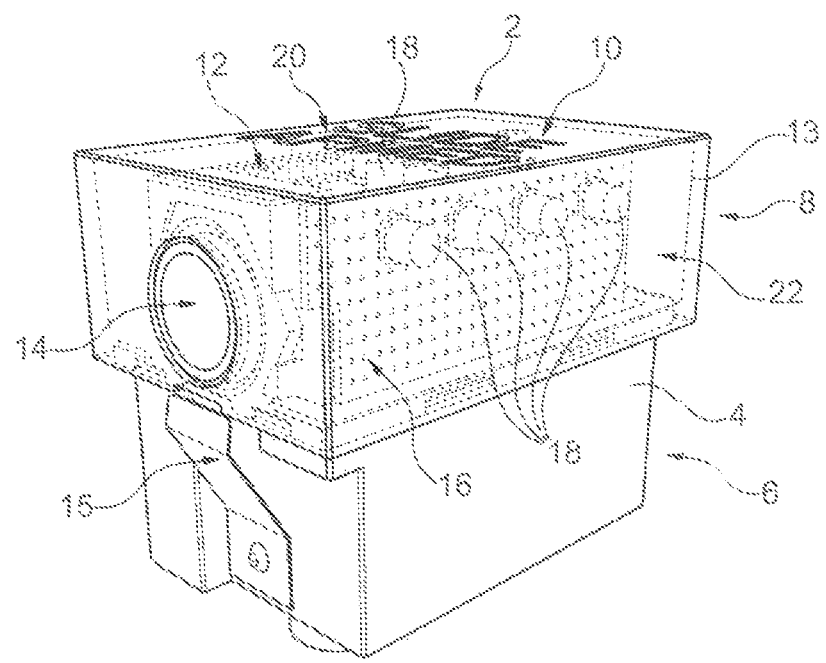
FIG. 1 depicts an indicating device according to the invention in a three-dimensional view.

FIG. 1 depicts an indicating device 2 according to the invention, comprising a housing 4 with a fastening section 6 and a visible side 8. Disposed in indicating device 2 is a signaling device that is obscured in FIG. 1 and that is in form of an non-volatile electronic memory 9 (see FIG. 8), an optical signal device 10 comprising, as an example, a plurality of lighting or illuminating devices 18, an enabling device in the form of an RFID reading device 11 obscured in FIG. 1 (see FIG. 8), a reset device obscured in FIG. 1 and connected to the memory 9 in the form of a further RFID reading device 17 (see FIG. 8), an acoustic signal device 12 obscured in FIG. 1 and a sensor 14 for detecting the distance of an object from the indicating device 2. As an example, the optical signal device 10 and the sensor 14 are arranged on the visible side 8 one below the other or beside each other, that is, consecutively along a spatial axis, whereas, as an example, the acoustic signal device 12 is located inside the indicating device 2 and facing away from the visible side 8. The fastening section 6 may further comprise elastic retaining clips 15 which, when inserting the fastening section 6 into a corresponding opening in a door trim or lining, form a positive and/or friction-type connection therewith.

Figure 6:
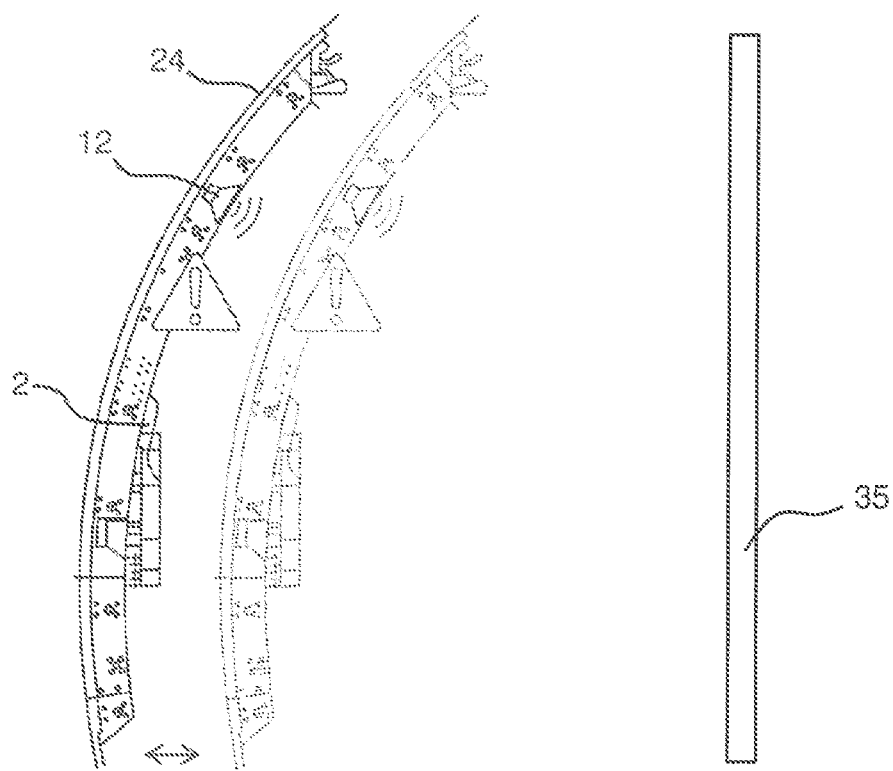
FIG. 6 shows an aircraft door, provided with the indicating device, during an opening process.

A control device in form of an electronics unit 16, which is also disposed in the indicating device 2 and of which in this depiction, in particular, a printed circuit board is recognizable, is connected to the memory 9, the optical signal device 10, the enabling device 11, the acoustic signal device 12 and the sensor 14, and is configured to selectively operate in a first warning mode the optical indicating device 10 and the acoustic signal device 12 and to store in a second monitoring mode an indication of a variation or change of the distance in the memory 9, wherein the operating in the first warning mode and the storing in the second monitoring mode is done on the basis of a detected distance of an object to the indicating device 2 or the sensor 14, respectively. This can be achieved in the warning mode, for example, through defining at least one limit or limit distance 32, 34 shown in FIG. 2, which an object is allowed to reach at most, so that the optical signal device 10 and the acoustic signal device 12, respectively, are operated. As will be explained below with reference to FIGS. 2 and 6, in the monitoring mode this can be achieved through defining a value by which the distance to a defined object may vary or change, at most, before the indication is stored in the memory 9.

For changing between the two operating modes, the enabling device 11 is provided, which, in the example, is designed as an RFID reading device. It is designed and configured such that it transmits at regular intervals a wireless interrogating signal with a code assigned to it, and that it reacts to a certain wireless response signal, which it receives from a passive RFID tag that is powered by the interrogating signal. This RFID tag, which together with the indicating device 2 forms a system, is paired with the enabling device 11, that is, it is configured so that it reacts to an interrogating signal having the code of the enabling device 11 with the transmission of a response signal with a code assigned to the RFID tag. The enabling device 11 analyses the response signal as to whether it contains the code of the RFID tag it is paired with. Only if this is the case will it cause a change in the operating mode of the electronics unit 16 by transmitting a first enable signal as an output signal to an enable signal input 59 of the electronics unit 16 if the electronics unit 16 is in the warning mode, and by transmitting a disable signal if the electronics unit 16 is in the monitoring mode (see FIG. 8).

The electronics unit 16 may comprise one or more additional enable signal inputs 56, 58 to which an enable signal may be transmitted. This is used to initiate the operation of the optical signal device 10 and the acoustic signal device 12 only when the aircraft is on the ground and the respective aircraft door can be opened at any time, that is, to activate the warning mode only in this case.

In the exemplary embodiment shown, the optical signal device 10 is separated from the visible side 8 only by a transparent cover 13, or is disposed in a cut-out provided therein, so that an unrestricted visibility of the optical signal device 10, that is, the illuminating devices 18, is allowed for, which illuminating devices 18 are suitable to generate a sufficiently bright light, flashing or continuous. The optical signal device 10 furthermore comprises as an example a lettering 20 ("Slide Armed"), which is configured as the only nontransparent surface of the optical signal device 10. Alternatively, the lettering 20 may also be realized as the only transparent surface of the optical signal device 10.

Sensor 14 is, for example, an ultrasonic sensor which periodically emits ultrasonic signals and calculates the distance to the respective object located in front of the sensor from the time difference between the emitted sound waves and the received sound reflections. Alternatively, it is also possible to utilize other types of sensors, for example optical sensors, camera-based sensors or radar-based sensors.

The indicating device 2 is designed as a very compact unit that may be utilized in place of a commonly used warning lamp in a door trim or lining or the like. As indicated earlier, to prevent excessive triggering of warning signals of optical or acoustic nature, it is expedient to operate the optical signal device 10 and/or the acoustic device 12 only if the aircraft is on the ground and the opening of the aircraft door is imminent. This may be achieved particularly easily by receiving an enable signal at the enable signal input 56, 58 which, however, requires a data line or single line with a logic signal to a central unit on board the aircraft.

Into the indicating device 2 an acceleration measuring unit or an inertial measurement unit (inertial platform or IMU, respectively) 22 (or 48 in FIG. 8) is integrated, which is obscured here and which is adapted or configured to acquire the spatial movements of the aircraft and to transmit them to the electronics unit 16. The fact that an aircraft has landed may be determined from significant events, for example a landing shock after a continuous descent. If this event has occurred, the electronics unit 16 can carry out the approach detection and the optical or acoustic warnings controlled thereby.

In particular, the acceleration measurement unit or inertial measurement unit is also configured to detect the inclination angle of the indicating device 2 about a predetermined axis and to transmit it to the electronics unit 16, with the predetermined axis corresponding to the pitch axis of the aircraft when the indicating device 2 is appropriately installed in the door 24 of an aircraft.

Figure 2:
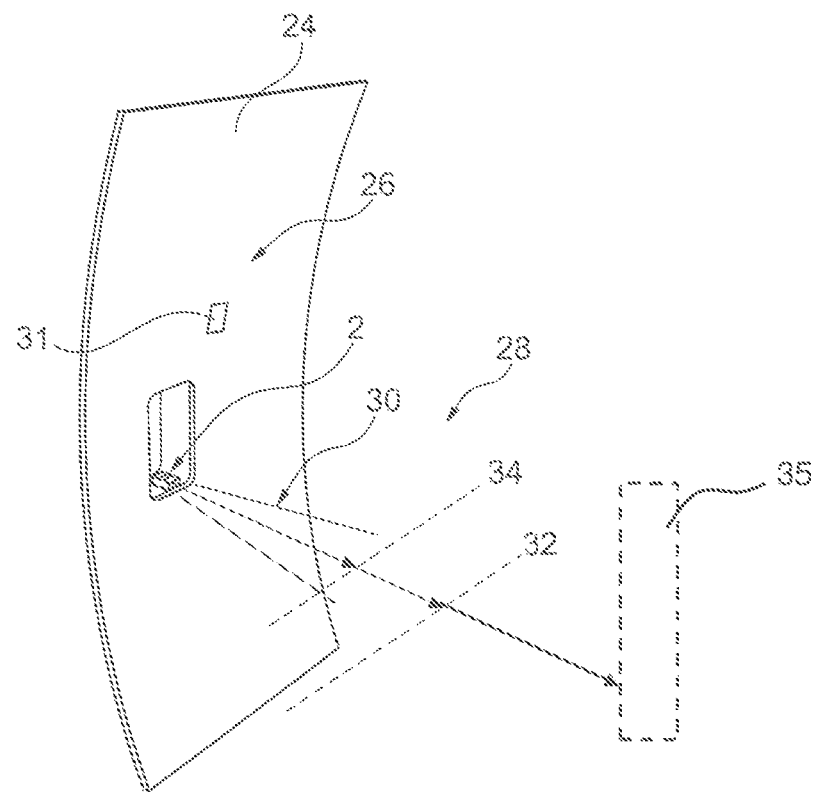
FIG. 2 depicts a possible installation position of the indicating device.

FIG. 2 depicts as an example an aircraft door 24 comprising a door trim or lining 26 that faces the interior of the aircraft fuselage. If the aircraft is located on a runway or in a parked position, the door 24 is opened from the inside of the aircraft. The indicating device 2 is integrated on or into the door trim 26, wherein the visible side 8 faces the interior of the aircraft.

Thus, if a person is in front of the door 24, the person is within the detection zone of the sensor 14. As indicated, the sensor 14 monitors a space 28 inside the aircraft and there defines a detection zone 30. The electronics unit 16 may, for example, define a first limit distance 32 as well as a second limit distance 34, wherein the electronics unit 16 operates the optical signal device 10 as soon as a person comes closer than the first limit distance 32 and wherein the acoustic signal device 12 is operated as soon as a person comes closer than the second limit distance 34. An expedient distance for the first limit distance 32 is a maximum of 1.1 m and preferably 0.9 m. An expedient distance for the second limit distance 34 is a maximum of 0.5 m and preferably 0.35 m.

If a person is located between the two lines indicating the limit distances 32 and 34, the person is only made aware optically, for example by a flashing light, to the fact that the emergency slide is still activated. If the person comes closer to the door 24, an additional acoustic signaling is effected if the distance to the door 24 is close to an arm's length. It is of course possible to make the two limit distances 32 and 34 equal so that an optical and an acoustic signaling occurs simultaneously. Finally, preferably, provision is made that the electronics unit 16 operates the optical signal device 10 and the acoustic signal device 12 so as to emit a continuous light or a continuous warning sound, respectively, if the door opening lever is moved a predetermined distance towards the door-open position while the emergency slide is armed. To this end the electronics unit 16 is preferably connected via a further input to a sensor that monitors the position of the door opening lever.

Moreover, the detection zone 30 of the sensor 14 is chosen and oriented in such a way that, when the door 24 is closed, a stationary component 35 of the aircraft, for example a wall of an on-board galley, is located inside the detection zone 30 in a defined distance from the sensor 14. If, with the door 24 closed, the electronics unit 16 is in its monitoring mode it monitors whether the defined distance varies or changes by more than a predefined limit value. As soon as this is the case it is an indication that an opening of the door has occurred which, as can be seen from FIG. 6, causes an increase in the distance between the door 24 and the stationary component 35. The electronics unit then outputs a control signal to the memory 9, which causes a first predetermined value to be stored at a predetermined storage location of the memory 9. This value indicates that an opening of the door 24 has occurred, and it can only be reset by the reset device 17, which will be described later with reference to FIG. 8. As has been explained above, the storing of the first predetermined value may also be caused by a non-authorized person having gained access to the aircraft in some other way and moving through the detection zone 30 of the sensor 14.

Figure 3:
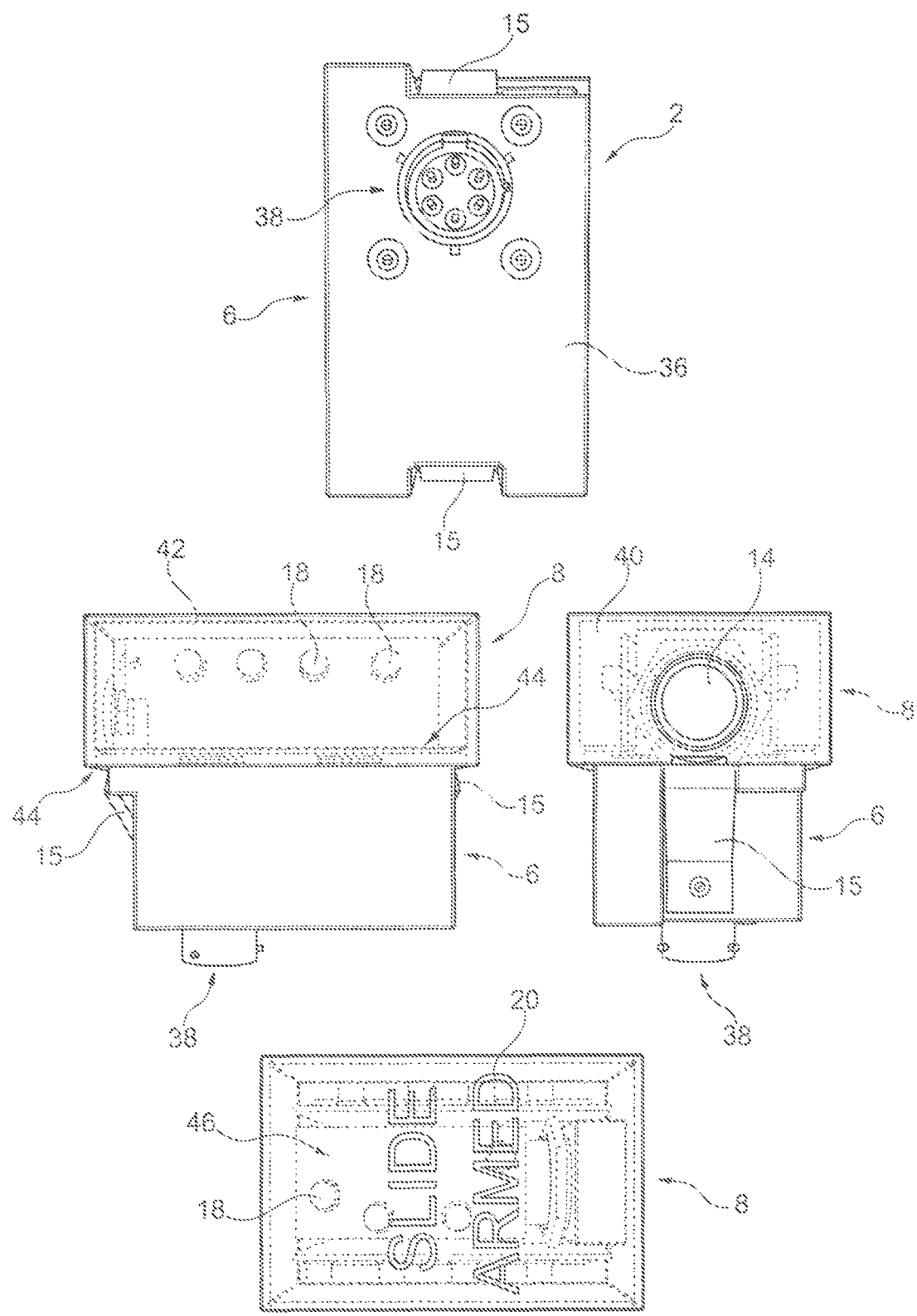
FIG. 3 depicts the indicating device in a four-side-view.

FIG. 3 shows a four-side illustration of the indicating device 2, in which an underside 36 is shown with an electrical connection 38, which is to be connected to a power supply of the door 24 and which is further coupled to a sensor (not shown) that monitors the emergency slide activation lever 31, and which electrical connection 38 may also, depending on the aircraft type, be implemented as an outgoing breakout cable having a connecting plug connected at the end. This may be achieved either via an enable signal that depends on the position of the emergency slide activation lever 31, or via a power supply that is dependent on the position of the emergency slide activation lever 31.

A narrow end 40 of the visible section 8 comprises primarily the sensor 14 which, when installed as shown in FIG. 2, points directly into the interior of the aircraft fuselage. On a side wall 42 the illuminating devices 18 are recognizable, which are distributed along the side wall 42 inside the cover 13. The fastening section 6 is designed to be narrower than the visible section 8 so that, when the indicating device 2 is clipped or snapped into an opening, an edge 44 facing the fastening section 6 can abut a rim of the respective opening and the retaining clips 15 promote a flush contact of the edge 44 with the rim of the respective opening The lettering 20 is arranged on an upper side 46 and extends there essentially across the available width of the cover 13. Through the transparency of the cover 13 further illuminating devices 18 are recognizable, providing a backlight for the lettering 20.

Figure 4:
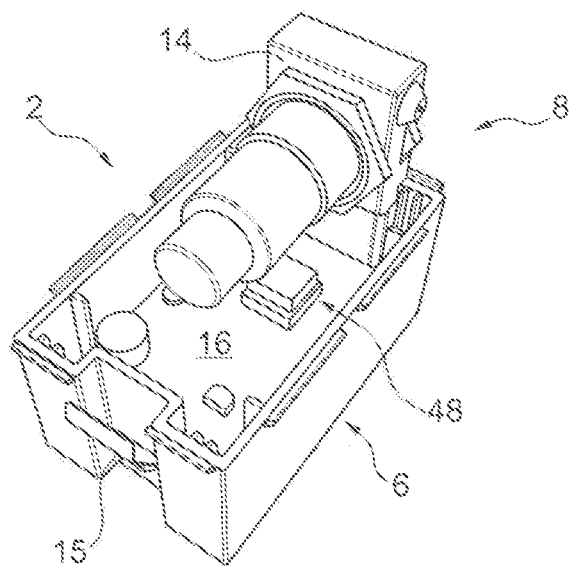
FIG. 4 shows the indicating device in a partially dismantled view.

FIG. 4 depicts, furthermore, the indicating device 2 in a partially dismantled state, wherein here an acceleration measuring unit 48 integrated into the electronics unit 16 can be seen, which acceleration measuring unit 48 can detect the movement of the indicating device 2 and thus that of the aircraft. Through evaluation of significant or characteristic events, such as that of a landing shock and a successive rapid reduction of the longitudinal speed caused by braking, it can be determined unambiguously that the aircraft is on the ground. This event may trigger an enable signal that initiates the activation of the approach or proximity detection in the space in front of the door 24.

Figure 5:
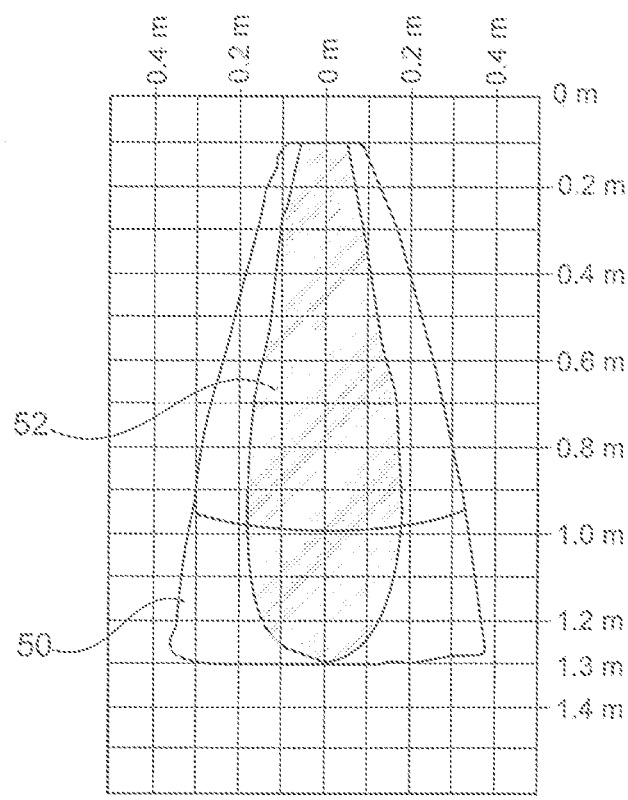
FIG. 5 depicts possible sonic cones of an ultrasonic sensor of the indicating device.

A diagram in FIG. 5, moreover, shows two preferred sonic beams 50 and 52 of the ultrasonic sensor 14, wherein the sonic beam 50 belongs to an ultrasonic sensor with oriented plate and the sonic beam 52 belongs to an ultrasonic sensor with a pipe of 27 mm diameter, for example. For the precise recognition of a person directly in front of the ultrasonic sensor who approaches the door 24, and for the precise recognition of a change in distance to the stationary component 35, the sonic beam should be set as narrow as possible so that a width of significantly less than one meter and preferably 0.3 to 0.7 m is achieved. The detection zone 28 is thus quite narrow and allows ignoring persons and items that are at a greater lateral distance. In contrast to the solution with a pipe, the use of an oriented plate provides a slightly wider sonic beam 50.

Figure 7:
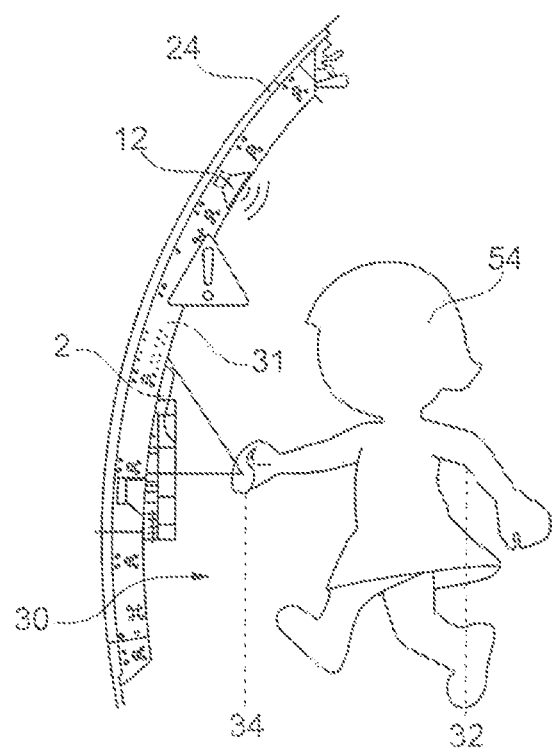
FIG. 7 shows a person in front of the aircraft door and a triggered indication.

In FIG. 7 a person 54 approaching the door 24 and, in this process, already having passed beyond the first limit distance 32 and having reached the second limit distance is depicted. An optical and an acoustic warning is emitted simultaneously so that the person 54 is warned unambiguously not to open the door 24 with an emergency slide activation lever 31 in the armed position.

Figure 8:
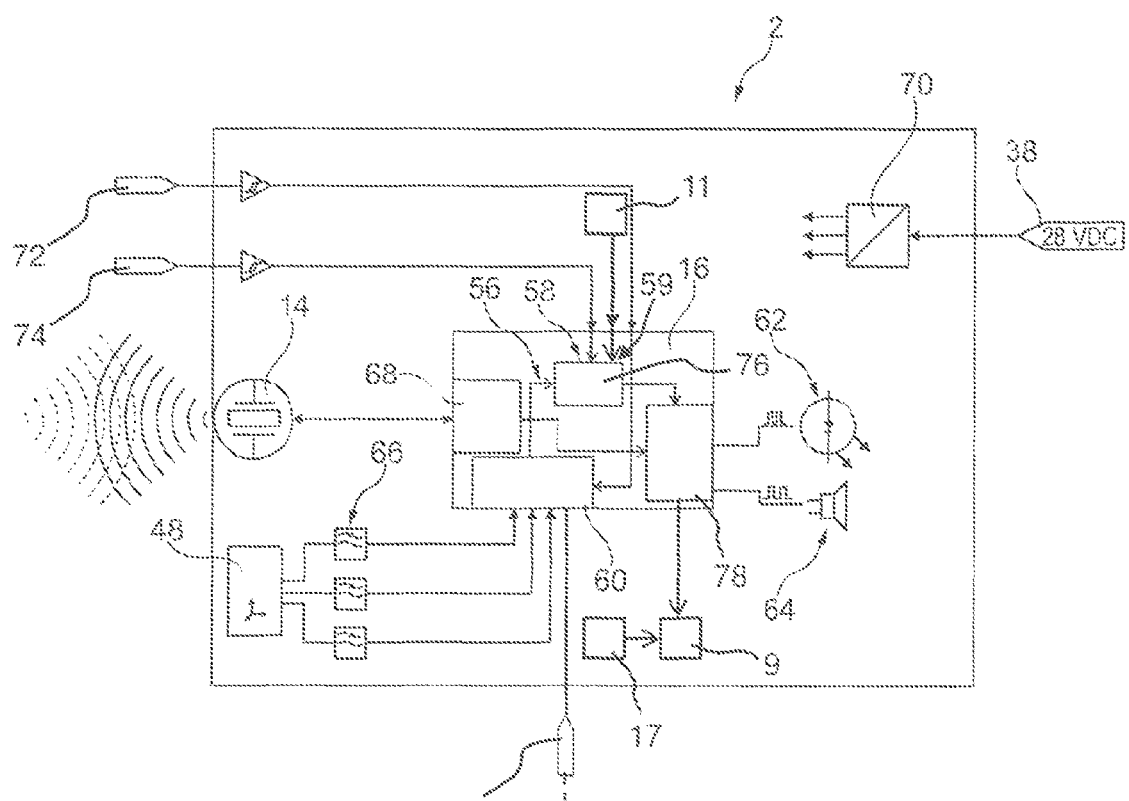
FIG. 8 depicts the indicating device in a schematic block diagram.
Figure 8:
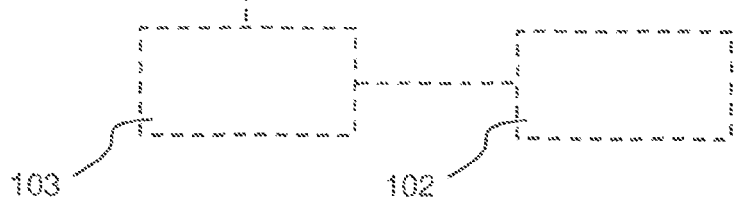

Further, FIG. 8 depicts an exemplary embodiment of the indicating device 2 in a schematic block diagram. The ultrasonic sensor 14 and the acceleration measuring unit 48 are connected to the electronics unit 16, which also comprises three enable signal inputs 56, 58 and 59 on a logic module 76. The acceleration measuring unit 48 is able to generate an enable signal via a corresponding logic circuit 60, which enable signal represents or is indicative of a landing that has occurred, wherein the enable signal is in this case sent to the enable signal input 56. A further enable signal, which is present at a connection or terminal 74 that is connected to a detector for the position of an emergency slide activating lever, can be sent to the second enable signal input 58, which represents an armed position of the emergency slide activating lever. If the aircraft is on the ground and the emergency slide activating lever is in an armed or activated position, a monitoring of the detection zone 30 is initiated. If it is determined in the electronics unit 16 that an object is located within at least one limit distance 32, 34, an optical signal 62 and/or an acoustic signal 64 is triggered via an output signal stage 78. The enable or disable signal, respectively, for changing between the operating modes may, as has already been explained above, be sent to the enable signal input 59.

The reset device 17 is connected to the memory 9 and is, similar to the enabling device 11, designed as an RFID reading device. It is designed and configured in such a manner that it transmits at regular intervals a wireless interrogating signal together with a code assigned to it, and that it responds to a certain wireless response signal, which it receives from a passive RFID tag, which is supplied with power through the interrogating signal. The RFID tag, which forms a system together with the indicating device 2, is paired with the reset device 17, that is, it is configured in such a manner that it reacts to an interrogating signal having the code of the reset device 17 with the transmission of a response signal with a code assigned to the RFID tag. The reset device 17 analyses the response signal as to whether it contains the code of the RFID tag that it is paired with. Only when this is the case will it send a reset signal to the memory 9 which causes the memory 9 to store a second predetermined value that differs from the first predetermined value in the predetermined memory location. In this manner the memory 9 is prepared for a next monitoring task.

It goes without saying that filters 66 and 68 are connected downstream of the acceleration measuring unit 48 or the ultrasound sensor 14, respectively, so as to achieve a desired signal quality. Furthermore, a power supply unit 70 is connected to the connector 38. Additionally, a pin programming unit 72 is connected to the indicating device or is integrated therein to indicate in particular the orientation of the indicating device 2 relative to the flight direction.

In addition, the logic circuit 60 is designed such that a predetermined output signal is provided at an output terminal 80 of the indicating device 2 connected to the logic circuit when the acceleration measuring unit 48 detects an inclination angle about the predetermined axis which exceeds a predetermined inclination angle for at least a predetermined period of time. An emergency slide trigger device 103 can be connected to the output terminal 80 and can control the extension length of an emergency slide 102 on the basis of the signal received via this output terminal.

Figure 9A:
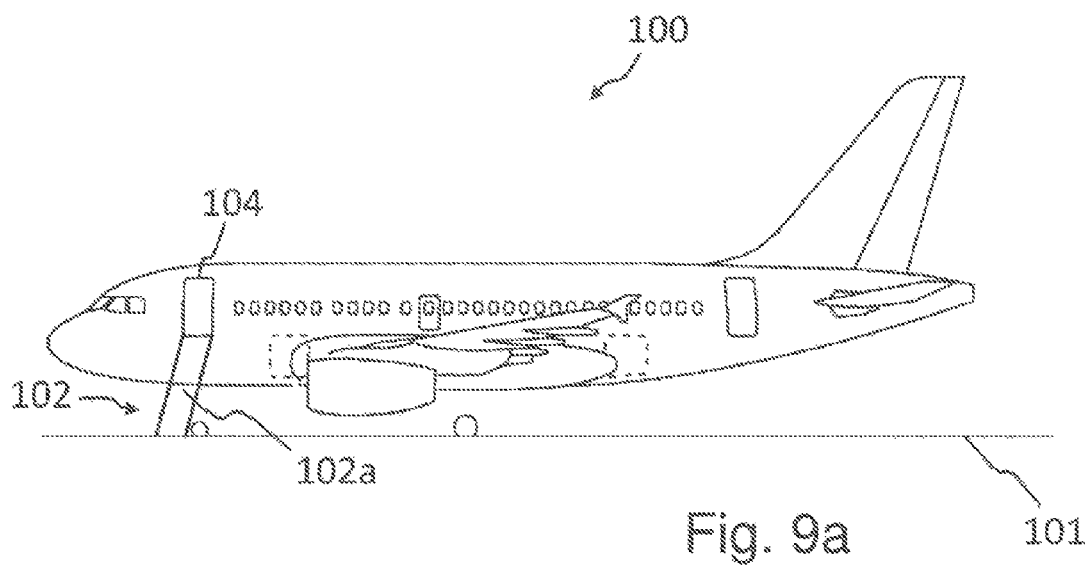
FIG. 9a shows an aircraft in a horizontal position with an extended emergency slide.
Figure 9B:
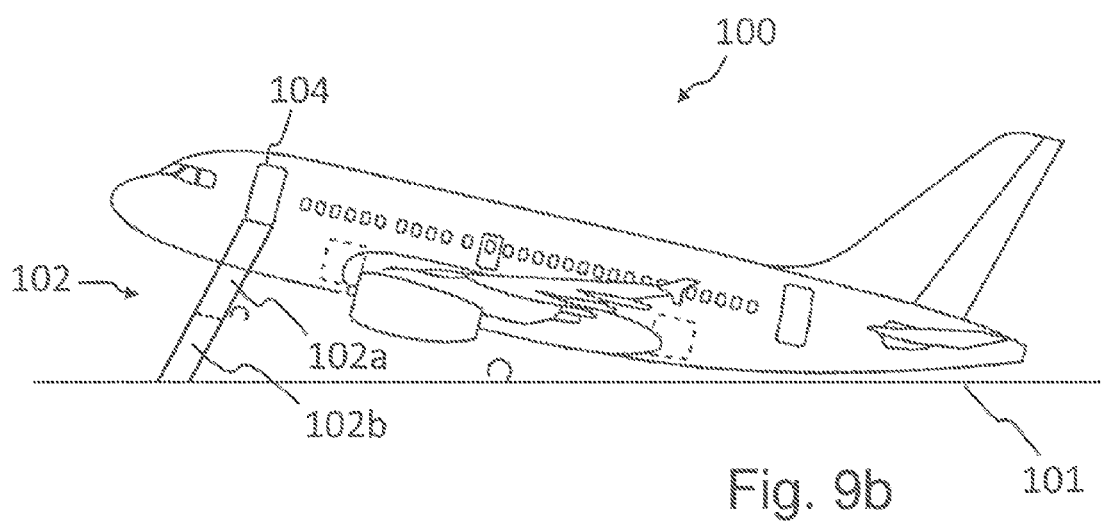
FIG. 9b shows the aircraft of FIG. 9a in a position in which the nose is directed obliquely upwards, and in which both stages of the emergency slide are extended.

In FIGS. 9*a* and 9*b*, a landed aircraft 100 is in a horizontal position and an inclined position, respectively, relative to the ground 101, and has an extended emergency slide 102 in each case. The inclined position is a nose-up position, i.e., the nose of the aircraft points obliquely upwards. The emergency slide 102 has two extension stages 102*a* and 102*b* and, for the purpose of reaching two different extension lengths, it can either be activated such that only the stage 102*a* is extended or such that both stages 102*a*, 102*b* are extended. This control of the emergency slide 102 takes place in the manner described above by means of the emergency slide trigger or actuating device 103 (see FIG. 8), which controls the controlling on the basis of the signal received via the output terminal 80.

In the horizontal position of FIG. 9*a*, the distance between the front door or door arrangement 104 and the ground 101 is less than in the inclined position of FIG. 9*b*. For that reason, only the first stage 102*a* is extended in the former case, and both stages are extended in the latter case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An indicating device for indicating an activation status of an emergency slide in an aircraft comprising:
   at least one of an optical signal device for emitting an optical signal or an acoustic signal device for emitting an acoustic signal,
   a status signal input for receiving a predefined status signal indicative of the activation status of the emergency slide, wherein the status signal has a first signal state, assigned to an activated state of the emergency slide, and a second signal state, assigned to a deactivated state of the emergency slide, and
   a control device, connected to the optical signal device and the acoustic signal device, respectively, and to the status signal input and which is configured to operate the optical signal device and the acoustic signal device, respectively, as a function of the status signal received via the status signal input, in order to indicate the signal state of the status signal, wherein
   the indicating device is configured as a continuous, compact unit, which is configured to be arranged on a door of an aircraft,
   the indicating device further comprises an inclination angle measurement device connected to the control device and configured to determine the inclination angle of the indicating device about a predetermined axis and emit an inclination angle signal output, and
   the control device is further configured to determine, on the basis of the inclination angle determined by the inclination angle measurement device, whether a predetermined inclination angle about the predetermined axis has been exceeded for a predetermined period of time, and to only emit a predetermined output signal via the inclination angle signal output if the predetermined inclination angle has been exceeded for the predetermined time period.

2. The indicating device according to claim 1, wherein the inclination angle measurement device comprises an inertial measurement unit with at least one inertial sensor for continuously or periodically detecting at least one directed acceleration.

3. The indicating device according to claim 2, wherein one of the at least one inertial sensor is adapted to detect the rotational acceleration about the predetermined axis.

4. The indicating device according to claim 2, wherein the at least one inertial sensor comprises three inertial sensors, each of which is adapted to detect the acceleration along another one of three different spatial directions.

5. The indicating device according to claim 1, wherein the inclination angle signal output comprises an external terminal of the indicating device for connection to an external device.

6. The indicating device according to claim 1, wherein the inclination angle signal output is connected to the at least one of the optical signal device or the acoustic signal device and the at least one of the optical signal device and the acoustic signal device, respectively, are adapted to emit a predetermined optical signal and a predetermined acoustic signal, respectively, when the predetermined output signal is received.

7. The indicating device according to claim 1, wherein the control device is configured such that at least one of the predetermined inclination angle or the predetermined time period are adjustable.

8. The indicating device according to claim 1, which further comprises a power supply terminal for connection to an external power supply and a rechargeable energy storage device, arranged such that the energy storage device is charged with power received via the power supply terminal during operation of the indicating device and, in the event of failure of the external power supply, the energy storage device operates at least the control device and the inclination angle measurement device.

9. The indicating device according to claim 1, wherein the control device is further adapted to calibrate the inclination angle measurement device to an inclination angle about the predetermined axis of zero degrees upon each change of the status signal received at the status signal input from at least one of the second signal state to the first signal state, or from the first signal state to the second signal state.

10. The indicating device according to claim 1, which further comprises:
   a sensor configured to detect a distance between the sensor and an object located in a detection zone in front of the sensor,
   a signaling device, having a first state and a second state, a reset device coupled to the signaling device and configured to set the signaling device to the first state when a predetermined reset operation is carried out by a user, and an enabling device, configured to selectively provide as an output signal a predetermined disable signal and a predetermined first enable signal, wherein the control device is coupled to the sensor, the signaling device and the enabling device and is configured to change to a first operating mode when the disable signal is received and change to a second operating mode when the first enable signal is received, in which second operating mode it detects, on the basis of a sensor signal provided by the sensor and characteristic for the distance between the sensor and the object, a change in the distance between the sensor and the object and, when a change is detected, it sets the signaling device to the second state until the predetermined reset operation is carried out, so that, following arrangement of the indicating device on a door of the aircraft, which door is located at a distance from a stationary component in the interior of an aircraft, in such a way that the stationary component is located in the detection zone of the sensor and an opening of the door brings about a change in the distance of the sensor from the stationary component, and subsequent provision of the first enable signal by the enabling device with the door closed, a change of the signaling device from the first state to the second state indicates that the door has been opened.

11. The indicating device according to claim 10, wherein the signaling device comprises a non-volatile electronic memory device and wherein the first state and the second state correspond to different predetermined values stored in a predetermined memory area of the memory device.

12. The indicating device according to claim 1, comprising an optical signal device for emitting an optical signal and an acoustic signal device for emitting an acoustic signal, wherein the control device is configured to operate at least one of the optical signal device and the acoustic signal device on approach of a person below at least one predetermined limit distance.

13. The indicating device according to claim 2, further comprising an optical signal device for emitting an optical signal and an acoustic signal device for emitting an acoustic signal, wherein the control device is configured to operate at least one of the optical signal device and the acoustic signal device on approach of a person below at least one predetermined limit distance, wherein the control device is configured to determine from the detected at least one directed acceleration whether the aircraft is on the ground, and to realize the operation of at least one of the optical signal device and the acoustic signal device only when it has been determined that the aircraft is on the ground.

14. The indicating device according to claim 1, further comprising a housing with a fastening section and a visible side, wherein the fastening section is configured to undergo a mechanical connection with the door trim or a fastener on the aircraft door.

15. A door arrangement for an aircraft, comprising:
a door panel with a defined horizontal direction, a first side and an opposite second side, which door panel is adapted to be mounted in an opening in a fuselage of an aircraft in such a way that it is movable between a closed position, in which it closes the opening, the horizontal direction running parallel to a horizontal surface in the case of the aircraft being on the horizontal surface, and the first side faces an internal space of the aircraft and the second side faces outwardly, and an opened position, in which the opening is accessible, an indicating device arranged on the door panel, the indicating device comprising:

at least one of an optical signal device for emitting an optical signal or an acoustic signal device for emitting an acoustic signal, a status signal input for receiving a predefined status signal indicative of the activation status of the emergency slide, wherein the status signal has a first signal state, assigned to an activated state of the emergency slide, and a second signal state, assigned to a deactivated state of the emergency slide, and a control device, connected to the optical signal device and the acoustic signal device, respectively, and to the status signal input and which is configured to operate the optical signal device and the acoustic signal device, respectively, as a function of the status signal received via the status signal input, in order to indicate the signal state of the status signal, wherein the indicating device is configured as a continuous, compact unit, which is configured to be arranged on a door of an aircraft, the indicating device further comprises an inclination angle measurement device connected to the control device and configured to determine the inclination angle of the indicating device about a predetermined axis and emit an inclination angle signal output, and the control device is further configured to determine, on the basis of the inclination angle determined by the inclination angle measurement device, whether a predetermined inclination angle about the predetermined axis has been exceeded for a predetermined period of time, and to only emit a predetermined output signal via the inclination angle signal output if the predetermined inclination angle has been exceeded for the predetermined time period, an emergency slide, having a retracted state, from which the emergency slide can be selectively extended to a first extended state with a first length and to a second extended state with a second length which is different from the first length, an emergency slide actuation device, adapted to trigger the extension when the door panel is moved from the closed position towards the opened position and the emergency slide is in the activated state, and which comprises an activation element, movable to a first activation state, in which the emergency slide is in the activated state, and to a second activation state, in which the emergency slide is in the deactivated state, a status signal output, at which the status signal is emitted and which is connected to the status signal input, and an inclination angle signal input, connected to the inclination angle signal output, wherein the emergency slide actuation device is further adapted such that, when triggering, it controls the extension of the emergency slide in such a way that, when the predetermined output signal is not received at the inclination angle signal input, the emergency slide is extended to the first extended state, and is extended to the second extended state when the predetermined output signal is received at the inclination angle signal input.

16. An aircraft comprising
a fuselage, in which an opening is formed, and
a door panel with a defined horizontal direction, a first side and an opposite second side, which door panel is adapted to be mounted in an opening in a fuselage of an aircraft in such a way that it is movable between a closed position, in which it closes the opening, the horizontal direction running parallel to a horizontal surface in the case of the aircraft being on the horizontal surface, and the first side faces an internal space of the aircraft and the second side faces outwardly, and an opened position, in which the opening is accessible,
an indicating device arranged on the door panel, the indicating device comprising:
at least one of an optical signal device for emitting an optical signal or an acoustic signal device for emitting an acoustic signal,
a status signal input for receiving a predefined status signal indicative of the activation status of the emergency slide, wherein the status signal has a first signal state, assigned to an activated state of the emergency slide, and a second signal state, assigned to a deactivated state of the emergency slide, and
a control device, connected to the optical signal device and the acoustic signal device, respectively, and to the status signal input and which is configured to operate the optical signal device and the acoustic signal device, respectively, as a function of the status signal received via the status signal input, in order to indicate the signal state of the status signal, wherein
the indicating device is configured as a continuous, compact unit, which is configured to be arranged on a door of an aircraft,
the indicating device further comprises an inclination angle measurement device connected to the control device and configured to determine the inclination angle of the indicating device about a predetermined axis and emit an inclination angle signal output, and
the control device is further configured to determine, on the basis of the inclination angle determined by the inclination angle measurement device, whether a predetermined inclination angle about the predetermined axis has been exceeded for a predetermined period of time, and to only emit a predetermined output signal via the inclination angle signal output if the predetermined inclination angle has been exceeded for the predetermined time period,
an emergency slide, having a retracted state, from which the emergency slide can be selectively extended to a first extended state with a first length and to a second extended state with a second length which is different from the first length,
an emergency slide actuation device, adapted to trigger the extension when the door panel is moved from the closed position towards the opened position and the emergency slide is in the activated state, and which comprises
an activation element, movable to a first activation state, in which the emergency slide is in the activated state, and to a second activation state, in which the emergency slide is in the deactivated state,
a status signal output, at which the status signal is emitted and which is connected to the status signal input, and
an inclination angle signal input, connected to the inclination angle signal output,
wherein the emergency slide actuation device is further adapted such that, when triggering, it controls the extension of the emergency slide in such a way that, when the predetermined output signal is not received at the inclination angle signal input, the emergency slide is extended to the first extended state, and is extended to the second extended state when the predetermined output signal is received at the inclination angle signal input,
the door panel of the door arrangement being mounted in such a way in the opening that the door panel can be moved between a closed position, in which the door panel closes the opening, the first side faces an interior space of the aircraft, the second side faces outwards and the horizontal direction runs parallel to a horizontal surface in the case of the aircraft being on the horizontal surface, and an opened position, in which the opening is accessible.

* * * * *